United States Patent
Poon

(10) Patent No.: US 8,098,333 B2
(45) Date of Patent: Jan. 17, 2012

(54) PHASE SHIFT INSERTION METHOD FOR REDUCING MOTION ARTIFACTS ON HOLD-TYPE DISPLAYS

(75) Inventor: Eunice Poon, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1236 days.

(21) Appl. No.: 11/771,511

(22) Filed: Jun. 29, 2007

(65) Prior Publication Data

US 2009/0002559 A1 Jan. 1, 2009

(51) Int. Cl.
*H04N 5/00* (2011.01)

(52) U.S. Cl. .......... 348/607; 348/625; 348/790; 345/87; 382/275

(58) Field of Classification Search .......... 348/607–627, 348/790–792; 345/87, 94, 100; 382/275, 382/261, 262
See application file for complete search history.

(56) References Cited

U.S. PATENT DOCUMENTS

| | | | |
|---|---|---|---|
| 5,134,480 A | 7/1992 | Wang et al. | |
| 6,002,440 A | 12/1999 | Dalby et al. | |
| 6,545,740 B2 | 4/2003 | Werner | |
| 7,859,497 B2 * | 12/2010 | Kong et al. | 345/87 |
| 2004/0012551 A1 | 1/2004 | Ishii | |
| 2004/0252255 A1 | 12/2004 | Folkerts | |
| 2005/0248553 A1 | 11/2005 | Feng et al. | |
| 2006/0082559 A1 | 4/2006 | Louwsma et al. | |
| 2009/0226110 A1 * | 9/2009 | Chen et al. | 382/263 |

FOREIGN PATENT DOCUMENTS

JP 2002351382 A * 12/2002

* cited by examiner

*Primary Examiner* — Michael Lee
(74) *Attorney, Agent, or Firm* — Mark P. Watson

(57) ABSTRACT

A method and system for displaying frames on a hold-type display to reduce perceived blur are disclosed. One example method includes detecting a parameter associated with an object in an input frame and filtering the input frame to generate at least two filtered sub-frames based on the parameter. The filtered sub-frames are then inserted in place of the input frame in a frame sequence and output to a display. The parameter associated with the object may indicate a magnitude and direction of the object's movement in a sequence of frames including the input frame.

8 Claims, 5 Drawing Sheets

PHASE SHIFT INSERTION METHOD FOR REDUCING MOTION ARTIFACTS ON HOLD-TYPE DISPLAYS

BACKGROUND

1. The Field of the Invention

The following relates generally to image processing and more particularly to a method and system for compensating for perceived motion blur in digital video hold-type displays.

2. The Relevant Technology

Moving objects in digital video displayed on a hold-type display device such as a liquid crystal display (LCD) can appear blurry to an observer. The perceived blur is caused in part by the relatively slow "LC response" of the liquid crystal cells. When compared with an impulse-type device such as a cathode ray tube (CRT) device, for example, an LCD device has a much slower brightness transition response time. The perceived blur is also caused in part by prolonged light emission inherent in the sample-and-hold driving technique commonly employed by LCD devices, which results in formation of after-images on the human retina. These after-images produce a blurred visual perception as the video sequence is being observed.

Turning to FIG. 1, a schematic diagram showing perceived blur in a digital video image frame resulting from the LCD device and the motion perception mechanisms of the human visual system is shown. As an input video sequence is input to a LCD device, each digital video image, or frame, from the input video sequence is displayed and sustained on the LCD device for one frame interval. While viewing a scene in motion, the human eyes actively track the scene with smooth pursuit eye movement so as to generate a stabilized image on the human retina, as described by M. J. Hawken and K. R. Gegenfurtner in the publication entitled "Pursuit Eye Movements to Second Order Motion Targets" (Journal of the Optical Society of America A, 18(9), pp 2292-2296, 2001). The human visual system then undertakes visual temporal low pass filtering in order to perceive a flicker-free image.

FIGS. 2a to 2d are frame and timing diagrams showing the tracking behavior of the human eye that results in perceived blur in the digital video image. FIG. 2a shows a typical frame in two dimensions. FIG. 2b shows the horizontal position of one scanline in the frame of FIG. 2a as a function of time. FIG. 2c shows the motion compensated position of the scanline after the human eye has tracked its movement. It can be seen that the same light pattern is periodically imaged on the retina resulting in somewhat steady state vision. FIG. 2d shows the frame in motion as perceived by the human visual system, as a result of integration over one frame interval. It can be seen that the frame as perceived is blurry. It can therefore be seen that the combination of the LCD device and the tracking behavior of the human visual system results in a spatial low pass filtering effect, i.e., motion blur.

Numerous methods have been proposed to compensate for motion blur. One method is to insert a black frame between each pair of frames in a frame sequence. This method essentially simulates an impulse display, which does not suffer perceived motion blur problems. However, an overall reduction in brightness results from implementation of this method. Alternatively, video pre-processing may be applied to frames of the digital video sequence prior to display on the hold-type device. Video pre-processing methods that presently exist have certain drawbacks, however, such as high computational cost, loss of resolution, or artifacts such as false motion edges and frame juddering.

Given these and other drawbacks, it would be desirable to provide a novel method and system that compensates for perceived motion blur in digital video and that does so in a manner that minimizes computational cost, loss of resolution, and undesired side-effects such as false motion edges or frame juddering.

BRIEF SUMMARY

One example embodiment of the present invention is directed to methods and systems for displaying frames on a hold-type display to reduce perceived blur. One exemplary method includes detecting a parameter associated with an object in an input frame and filtering the input frame to generate at least two filtered sub-frames based on the parameter. The filtered sub-frames are then inserted in place of the input frame in a frame sequence and output to a display. The parameter associated with the object may indicate a magnitude and a direction of the object's movement in a sequence of frames including the input frame.

The frame filtering may include adjusting contrast in the input frame. The contrast may be adjusted by, for example, low-pass filtering the frame along a direction of an object's movement in the frame. The low-pass filtered frame may be superimposed with a spatially shifted copy of the input frame. The spatial shifting may be in one direction to generate a first sub-frame and in an opposite direction to generate a second sub-frame. The spatial shifting directions may correspond to the direction of the object's movement and the opposite direction, respectively.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various example embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The following description provides example embodiments of methods and systems for insertion of frames in a frame sequence to be displayed on, for example, a hold-type display. As explained above in the background section, objects moving in a frame sequence are susceptible to perceived motion blur when displayed on a hold-type display such as an LCD. In general, the methods and systems described herein apply a shift in image location relative to the retina during pursuit eye tracking to suppress motion blur. This is accomplished by processing or filtering an input frame sequence based on motion of objects detected in the input frames resulting in a new sequence of frames. The resulting output frame sequence may include two sub-frames, which replace every input frame, and may be output to a display at double the input frame sequence frequency. The output sub-frames may be generated by processing each original frame with two linear filters that are phase-shifted versions of each other and that are generated based on the detected motion of objects in the input frames. When the output sub-frames are perceived in rapid sequence by the human eye, motion blur that would otherwise be perceived may be reduced or eliminated.

Figure 1:
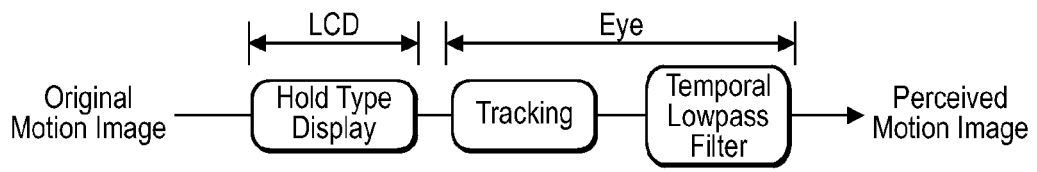
FIG. 1 is a schematic diagram showing the perceived blur in a digital video image frame resulting from a hold-type display device and the motion perception mechanism of the human visual system.
Figure 2A:
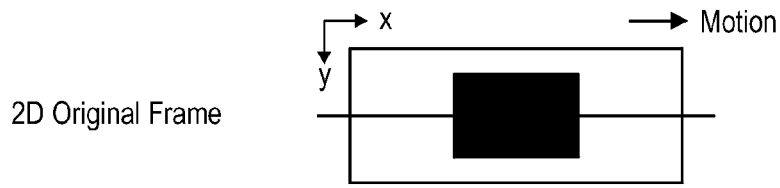
FIGS. 2a to 2d are frame and timing diagrams showing the tracking behavior of the human visual system that results in perceived blur of the frame of digital video.
Figure 2B:
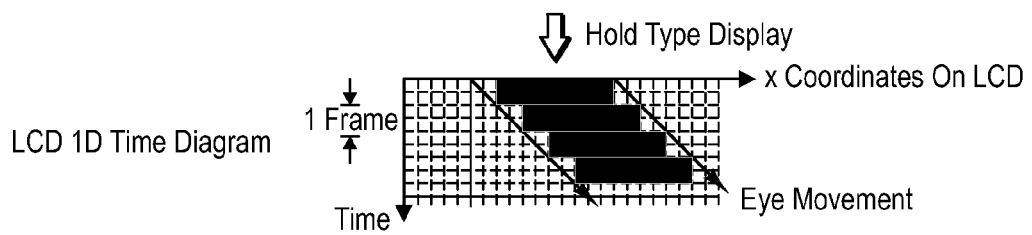
Figure 2C:
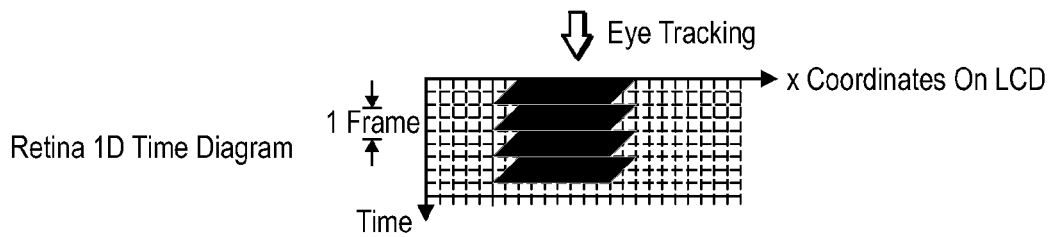
Figure 2D:
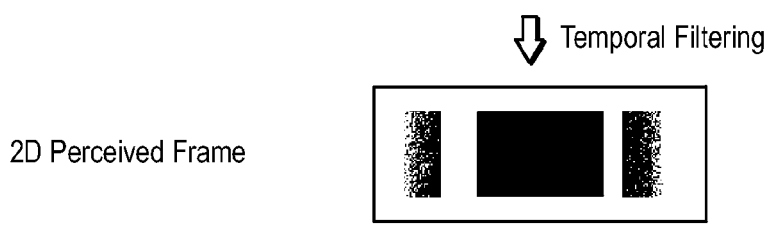
Figure 3:
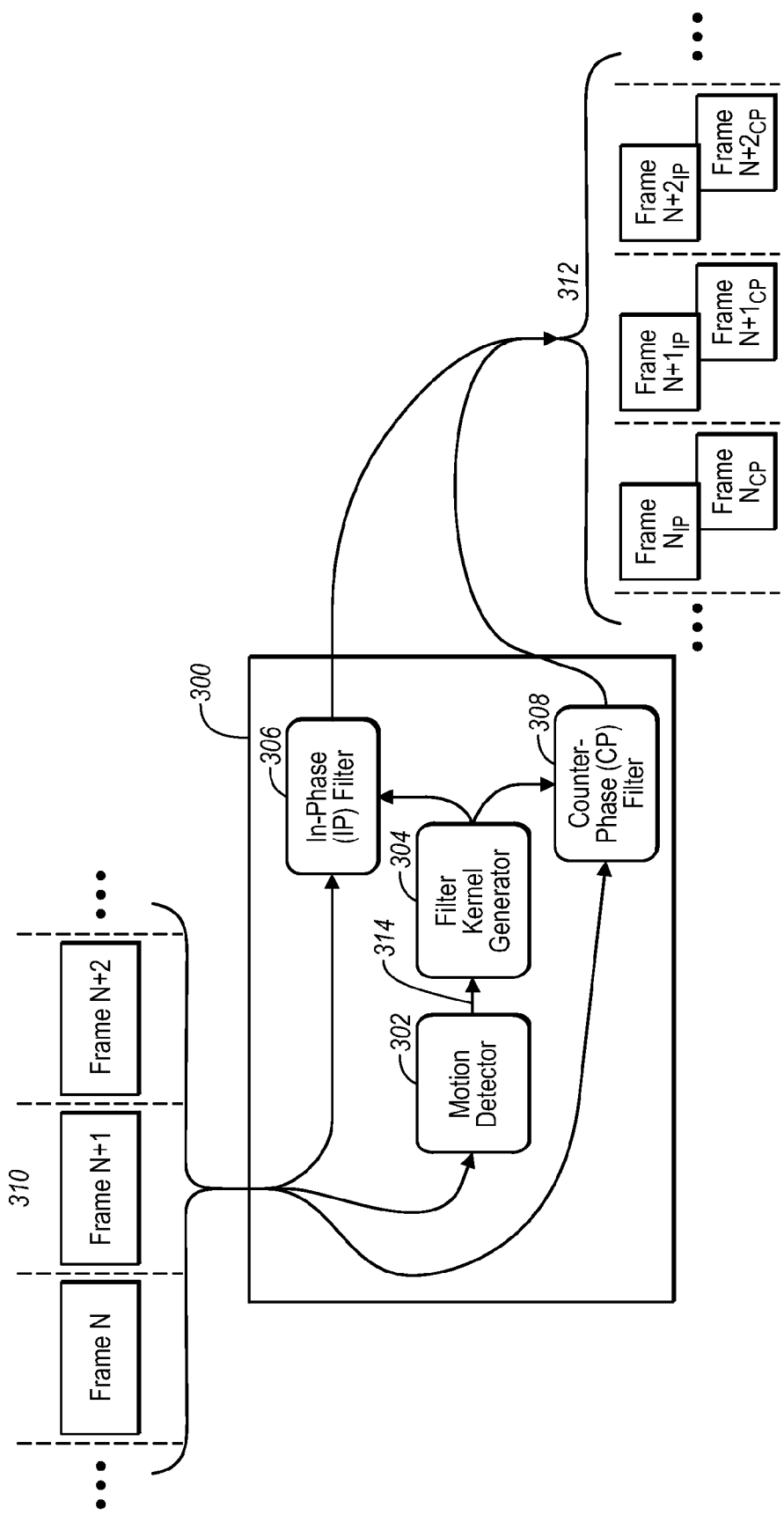
FIG. 3 is a functional block diagram of one example of a frame insertion system, in accordance with the present invention.

FIG. 3 shows a functional block diagram of one example of a frame insertion system 300 implemented in or external to a display. Frame insertion system 300 can be implemented using hardware, software, firmware, or any combination thereof. For example, frame insertion system 300 may include one or more circuits, such as dedicated processors, to carry out one or more functions of the various functional blocks shown. As used herein, the term circuit may also include other components such as digital processors, analog processors, programmable logic arrays and devices, programmable array logic, field programmable gate/logic arrays, electrically erasable/programmable read only memory, microcontrollers, application specific circuits, etc. In certain embodiments consistent with the invention, the functions of the various functional blocks may also be implemented as one or more threads on a central circuit or processor of frame insertion system 300.

Frame insertion system 300 may include a motion detector 302, a filter kernel generator 304, an in-phase filter 306, and a counter-phase filter 308. Frame insertion system 300 may receive a sequence of input frames 310 at motion detector 302, in-phase filter 306, and counter-phase filter 308 and may output a sequence of output sub-frames 312 from in-phase filter 306 and counter-phase filter 308. Frame insertion system 300 may also include input and output buffers (not shown) to hold input frames 310 and output sub-frames 312, respectively.

Motion detector 302 may detect motion associated with one or more objects represented in input frames 310. Motion detector 302 may be designed to detect local motion, global motion, or a combination of both. For example, motion detector 302 may detect motion in each of various pre-defined or dynamically defined blocks of pixels. Blocks of pixels may be defined to encompass a single pixel, an entire frame, or any size in between. Exemplary motion estimation algorithms that may be used in motion detector 302 are described in Lee et al., "Weighted-Adaptive Motion-Compensated Frame Rate Up-Conversion," in IEEE Transactions on Consumer Electronics, 49(3), 2003; Braspenning R. and G. De Haan, "True-Motion Estimation using Feature Correspondences," SPIE Proceedings of Visual Communications and Image Processing, January 2004, pp. 396-407; and U.S. patent application Ser. No. 10/827,394, filed on April 19, 2004, entitled "Motion Blur Correction," published as U.S. Patent Application Publication No. US 2005/0231603, each of which are incorporated herein by reference. Motion detector 302 may output one or more motion vectors 314, each of which may define a magnitude and a direction of motion associated with an object represented in input frames 310. For clarity of explanation, frame insertion system 300 will first be described in a case where only one motion vector 314 is detected, i.e. uniform frame motion. The description is later extended to cases involving multiple frame motion.

Using motion vector 314 as input, filter kernel generator 304 may derive filter coefficients for in-phase filter 306 and for counter-phase filter 308. For example, filter kernel generator 304 may construct a low-pass rectangular filter along a direction "x" corresponding to a motion direction of motion vector 314. The low-pass rectangular filter may be defined as follows:

$$LP(x) = \begin{cases} 1/r, & \text{if } 0 \leq x < r \\ 0, & \text{otherwise} \end{cases}$$

where r denotes one half times a magnitude of one of motion vectors 314 and x denotes an integer. Using LP(x), filter kernel generator 304 may generate a pair of filter kernels as follows:

$$H_{IP}(x) = (1+w) \cdot LP(x) - w \cdot \delta(x+1)$$

$$H_{CP}(x) = H_{IP}(-x-1)$$

where $\delta(x)$ denotes a delta function and w denotes a weighting value that may be set to, for example, any value between 0 and 1, inclusive. The subscripts IP and CP denote in-phase and counter-phase, respectively, based on the fact that $H_{CP}$ is a spatial-dimension reversed, phase-shifted version of $H_{IP}$.

Using filter coefficients from filter kernel generator 304, in-phase filter 306 and counter-phase filter 308 may then generate respective output sub-frames 312 according to the following convolution formulas:

$$(\text{Frame } N_{IP}) = (\text{Frame } N) \otimes H_{IP}$$

$$(\text{Frame } N_{CP}) = (\text{Frame } N) \otimes H_{CP}$$

Figure 4:
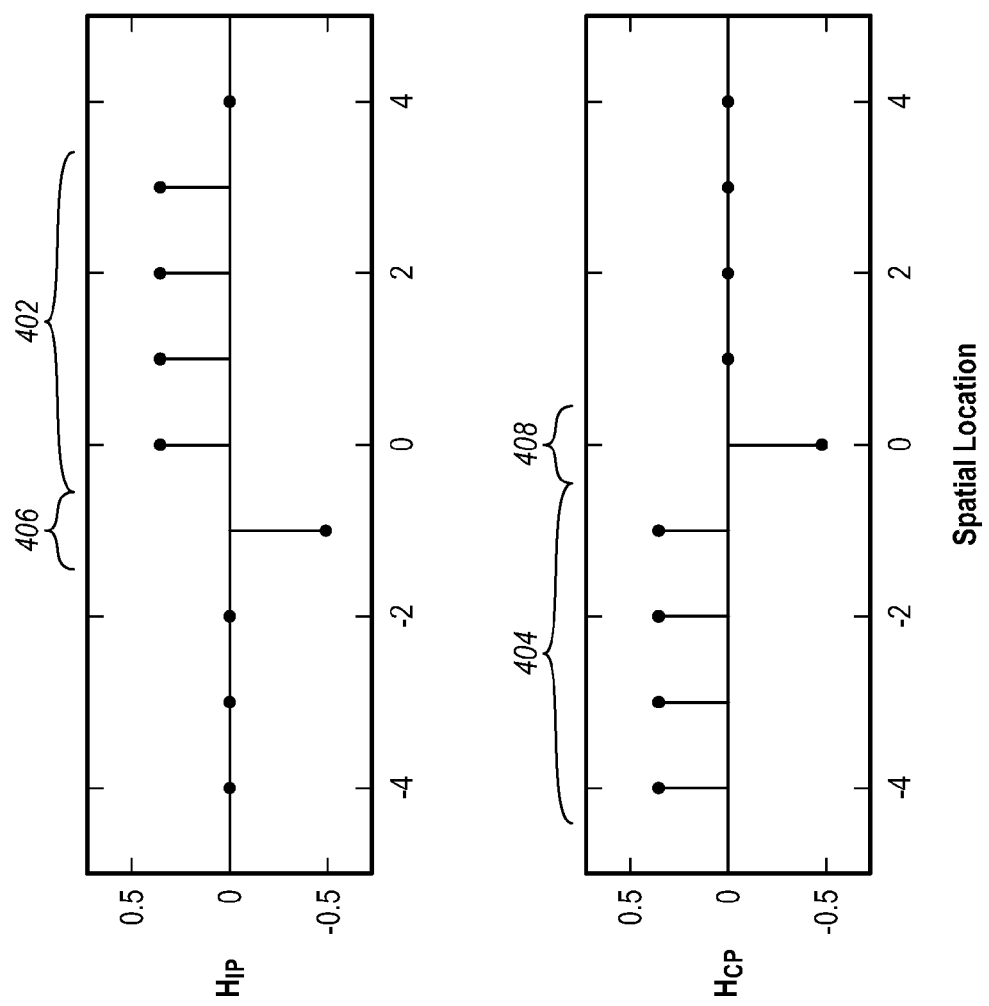
FIG. 4 illustrates coefficients in an exemplary pair of filters in the frame insertion system of FIG. 3.

FIG. 4 shows coefficients along a spatial dimension axis for an exemplary pair of filters $H_{IP}(x)$ and $H_{CP}(x)$ corresponding to a 7-pixel motion vector. As shown in the figure, $H_{CP}(x)$ is a spatial-dimension reversed, phase-shifted version of $H_{IP}(x)$. The rectangular low-pass portions of each filter 402 and 404 correspond to adjusting contrast in an input frame. In particular, the low-pass filter portions result in a blurring effect appearing at pixel intensity discontinuities (i.e., at edges of objects) along the spatial direction of the corresponding motion vector. The delta-function portions of each filter 406 and 408 correspond to a spatially shifted copy of the input frame. For $H_{IP}(x)$ the spatial shift occurs along the motion vector direction and for $H_{CP}(x)$ the spatial shift occurs in the opposite direction. In short, convolving the input frame with either $H_{IP}(x)$ or $H_{CP}(x)$ is tantamount to adjusting contrast in the input frame and superimposing the contrast adjusted frame with a spatially shifted copy of the input frame. In particular, the pixel intensity values in the spatially shifted copy are subtracted from the pixel intensity values in the contrast adjusted frame.

Frame insertion system 300 has been described for input frame sequences having uniform frame motion that results in only one motion vector. Frame insertion system 300 may also receive input frame sequences in which one or more objects move in multiple directions, resulting in the detection of multiple motion vectors 314. For example, filter kernel generator 304 may include an input buffer for storing multiple motion vectors 314 received from motion detector 302 and an output buffer for storing multiple sets of filter coefficients. (Alternatively, the input buffer of filter kernel generator 304 may be an output buffer of motion detector 302 and/or the output buffer of filter kernel generator 304 may be input buffers of filters 306 and 308.) For each motion vector detected in an input frame, filters 306 and 308 may generate intermediate sub-frames and store them in output buffers. For certain motion detection algorithms, each motion vector may correspond to a particular block of pixels around a moving object, in which case intermediate sub-frames may be sized according to sizes of their corresponding blocks of pixels. When all intermediate sub-frames are generated for a given input frame, the intermediate sub-frames may be appropriately combined or summed to generate output sub-frames 312.

Processing frames in a serial fashion with input and output buffers may incur a certain amount of delay. To avoid delay, frame insertion system 300 may process multiple motion vectors 314 in parallel using banks of filter kernel generators 304 and banks of filters 306 and 308. In this manner, input frames 310 may be processed and displayed in real time. In addition, to further improve processing speed, frame insertion system 300 may include a bank of motion detectors 302 to simultaneously detect motion in various portions of input frames 310. The number of components in each bank may vary depending upon the sophistication of the motion detection approach implemented. Generally, more components would be needed for more complex or higher resolution motion detection algorithms. In addition, frame insertion system 300 may be modified to receive multiple sequences of input frames 310, where each sequence corresponds to a different color such as red, green, or blue. The multiple sequences may be processed serially or in parallel, as described above.

Figure 5:
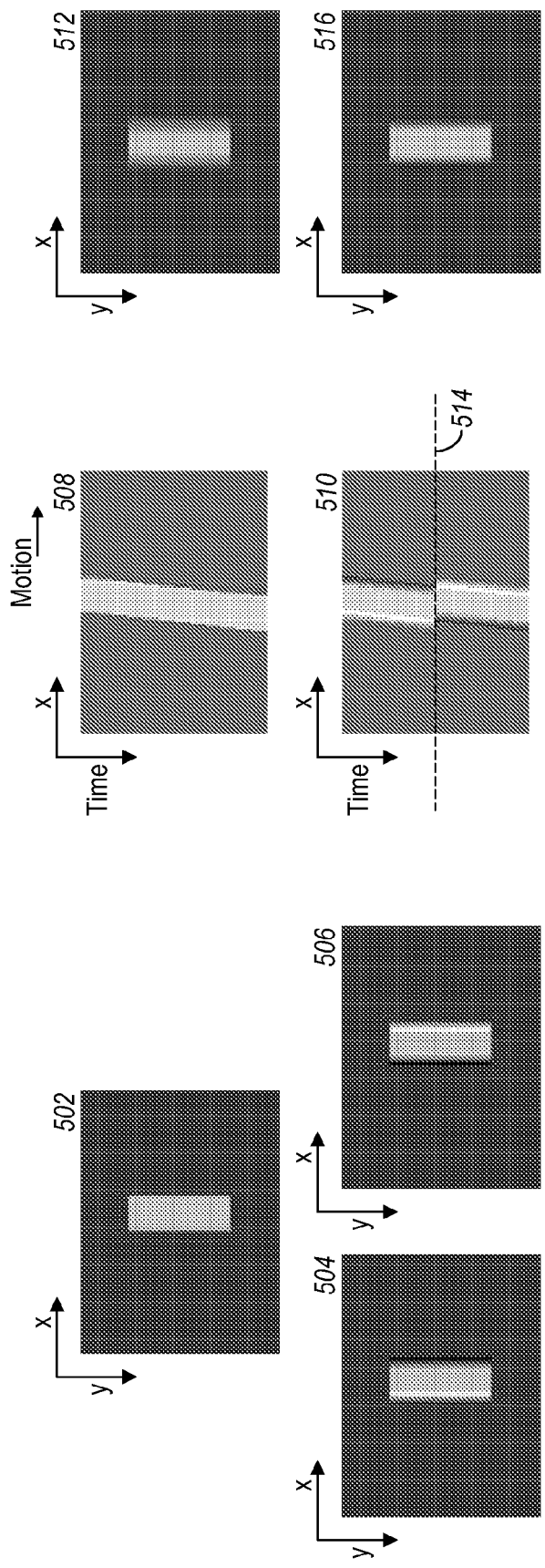
FIGS. 5A-5C are sample frames illustrating the effect of filtered frame insertion on a hold-type display.

FIGS. 5A-5C show sample frames illustrating the effects of filtered frame insertion on a hold-type display. Upper frame 502 in FIG. 5A represents an input frame in which a gray block is displayed. The axes in FIG. 5A are x and y dimensions of a display. In this example, the gray block is moving from left to right in a frame sequence. Lower frames 504 and 506 show an in-phase filtered sub-frame and a counter-phase filtered sub-frame, respectively, which are derived from processing input frame 502 with frame insertion system 300. As seen in sub-frames 504 and 506, the left and right edges of the gray block are blurred, but not the top and bottom edges. This is the case because the direction of motion is in a horizontal direction and the low-pass filter components of the in-phase and counter-phase filters are applied along this direction. Moreover, the lighter intensity area on the left edge and the darker intensity area on the right edge in sub-frame 504 can be attributed to the delta function component of in-phase filter 306. The opposite effect is seen in sub-frame 506 (i.e., lighter intensity on right edge and darker intensity on left edge) because the delta function component of counter-phase filter 308 is applied in an opposite direction.

In FIG. 5B, the vertical axis of each frame is time and a horizontal position of a scanline including the gray block is shown along the x-dimension. A top panel 508 shows a motion compensated position of the scanline after the human eye has tracked its left to right movement without filtered frame insertion. The eyes automatically track the moving object, causing a continuous shift in the retina image over one frame interval. This results in a blurry perceived image after temporal integration in the human visual system, as shown in top frame 512 of FIG. 5C.

In a bottom panel 510 of FIG. 5B, an in-phase filtered sub-frame is shown during a first half of an original frame interval (above dashed line 514) and a counter-phase filtered sub-frame is shown during a second half of an original frame interval (below dashed line 514). Thus dashed line 514 denotes a time halfway through an original frame interval. Because the sub-frames are opposing in phase, they suppress each other during temporal summation performed by the human eye and brain, yielding an overall perceived image with reduced motion blur, as shown in bottom frame 516 of FIG. 5C.

Figure 6:
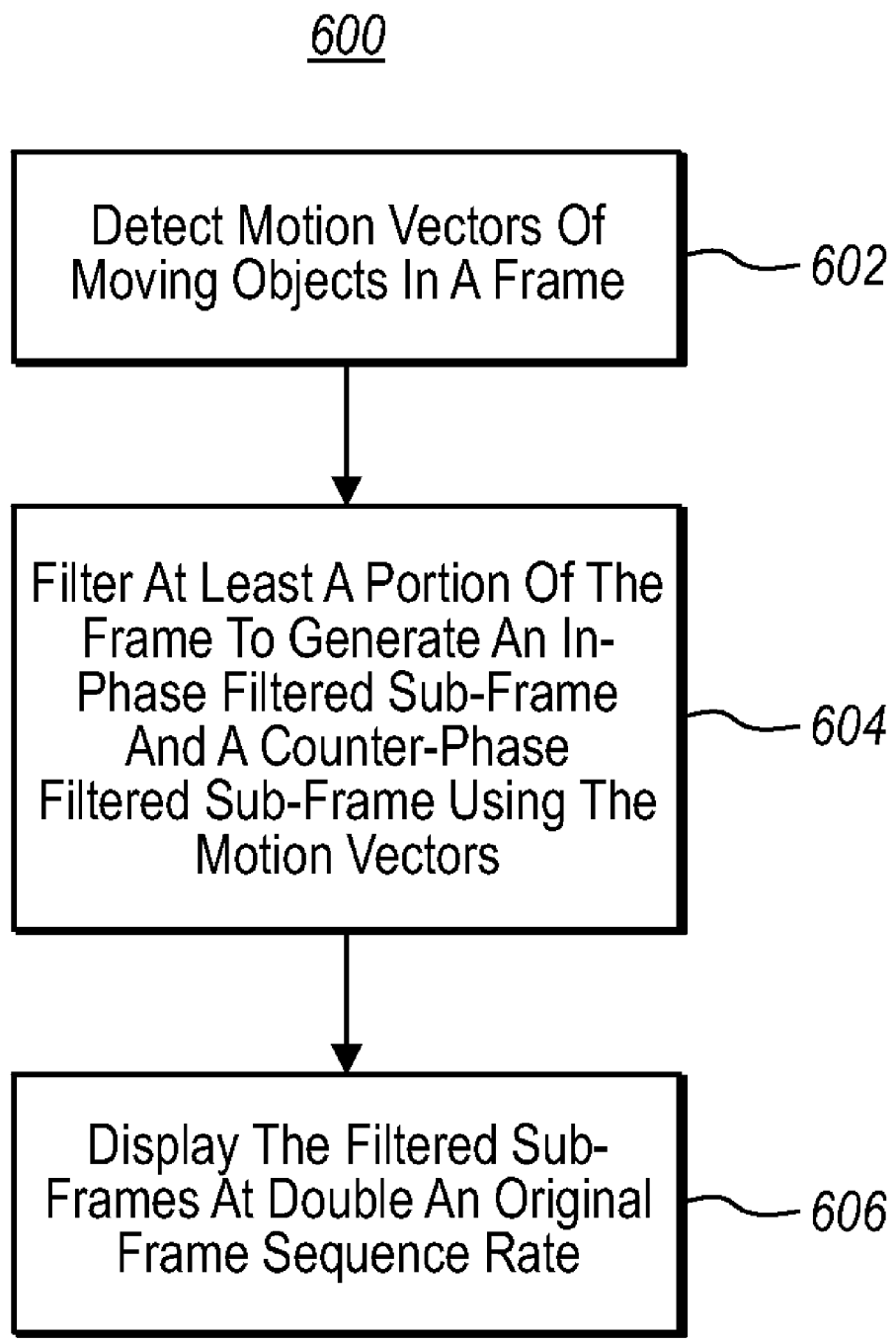
FIG. 6 is a flowchart for an exemplary method consistent with the present invention.

FIG. 6 shows a flowchart 600 that illustrates one example of a methodology for inserting frames in a frame sequence to reduce perceived motion blur. In flowchart 600, motion vectors associated with moving objects in an input frame are detected (stage 602). The frame may be part of an input frame sequence in which motion of one or more objects occurs. The motion vectors may each include a magnitude and a direction. Next, an in-phase filtered sub-frame and a counter-phase filtered sub-frame may be generated using the motion vectors (stage 604). Generating the in-phase sub-frame may include adjusting contrast in the input frame by low-pass filtering along a motion vector direction and superimposing the contrast adjusted frame with a copy of the input frame that is spatially shifted in the motion vector direction. The counter-phase sub-frame may be generated in a similar fashion but with the low-pass filtering and spatial shifting being applied in an opposite direction. Finally, the filtered sub-frames may be displayed on a hold-type display in temporal sequence (stage 606). The rate of display may be at double an original frame sequence display rate (e.g, at 240 Hz to simulate a 120 Hz display) since one input frame is replaced with two filtered sub-frames.

Stages shown in FIG. 6 may be modified in various ways. For example, the order of stages may be varied, certain stages may be omitted and/or additional stages may be added. The stages may be implemented or may occur at the same frequency or at differing frequencies. For example, motion detection stage 602 may occur less frequently than filter stage 604 and display stage 606 because motion may be detected over an entire frame sequence whereas each frame in the frame sequence may be filtered for display.

Embodiments herein may comprise a special purpose or general-purpose computer including various computer hardware implementations. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD- ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, the described embodiments may be combined with other systems and methods that compensate for perceived motion blur including, for example, black frame insertion, which is described in the background section above. Other methods and systems that may be combined with the described embodiments include, for instance: frame rate doubling, in which an original frame and a motion-interpolated frame are displayed at double the original display rate; and smooth frame insertion, in which high spatial frequency components are first removed from an original frame and then boosted to produce a first sub-frame and a second sub-frame, respectively, to be displayed at double the original display rate. One such combination system may automatically or manually switch between different blur compensation methods. Automatic switching may be based on various criteria such as manufacturer settings, user settings, and/or computational complexity. Another combination system may operate on the original frame using more than one blur compensation method resulting in an output frame sequence with three or more sub-frames.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for displaying frames on a hold-type display to reduce perceived blur, the method comprising:
   detecting a parameter associated with an object in a frame;
   filtering at least a portion of the frame with a first filter to generate an in-phase filtered sub-frame based on the parameter and filtering at least a portion of the frame with a second filter to generate a counter-phase filtered sub-frame based on the parameter; and
   displaying the in-phase filtered sub-frame and the counter-phase filtered sub-frame;
   wherein the first filter is spatially-reversed with respect to the second filter.

2. The method as recited in claim 1, wherein the parameter indicates the object's movement in the frame.

3. The method as recited in claim 2, wherein the parameter includes at least one of a magnitude and a direction of the object's movement.

4. The method as recited in claim 3, wherein the in-phase filtered sub-frame is filtered in a direction corresponding to the direction of the object's movement.

5. The method as recited in claim 4, wherein the counter-phase filtered sub-frame is filtered in a direction opposite to the direction of the object's movement.

6. The method as recited in claim 1, wherein the in-phase filtered sub-frame and the counter-phase filtered sub-frame are displayed in a temporal sequence.

7. A method for displaying frames on a hold-type display to reduce perceived blur, the method comprising:
   detecting a parameter associated with an object in a frame;
   filtering at least a portion of the frame with a first filter to generate an in-phase filtered sub-frame based on the parameter and filtering at least a portion of the frame with a second filter to generate a counter-phase filtered sub-frame based on the parameter; and
   displaying the in-phase filtered sub-frame and the counter-phase filtered sub-frame;
   wherein the first filter has the filter kernel:
   $H_1(x)=(1+w)\cdot LP(x)-w\cdot\delta(x+1)$; and the second filter has the filter kernel:
   $H_2(x)=H_1(x)(-x-1)$; and
   where $\delta(x)$ denotes a delta function, w denotes a weighting value and LP(x) denotes a low-pass filter.

8. The method as recited in claim 7, wherein:

$$LP(x) = \begin{cases} 1/r, & \text{if } 0 \leq x < r \\ 0, & \text{otherwise} \end{cases}$$

where r denotes one half times a magnitude of an object's movement in the frame.

* * * * *